J. BERGER, JR.

SEWING MACHINE.

APPLICATION FILED NOV. 11, 1919.

Reissued Mar. 9, 1920.

14,814.

7 SHEETS—SHEET 1.

Inventor

Joseph Berger Jr.

By Sturtevant Mason

Attorney

J. BERGER, Jr.
SEWING MACHINE.
APPLICATION FILED NOV. 11, 1919.

Reissued Mar. 9, 1920.

14,814
7 SHEETS—SHEET 2.

Inventor
Joseph Berger Jr.
By Sturtevant Mason
Attorneys

J. BERGER, JR.
SEWING MACHINE.
APPLICATION FILED NOV. 11, 1919.

Reissued Mar. 9, 1920.

14,814.
7 SHEETS—SHEET 3.

Inventor
Joseph Berger Jr
By Stuntevant & Mason
Attorneys

J. BERGER, Jr.
SEWING MACHINE.
APPLICATION FILED NOV. 11, 1919.

Reissued Mar. 9, 1920.

14,814.
7 SHEETS—SHEET 4.

Inventor
Joseph Berger Jr
By Shurtleff & Mason
Attorneys

J. BERGER, Jr.

SEWING MACHINE.

APPLICATION FILED NOV. 11, 1919.

Reissued Mar. 9, 1920.

14,814.

7 SHEETS—SHEET 5.

Inventor

Joseph Berger Jr

By Sturtevant & Mason

Attorneys

J. BERGER, Jr.

SEWING MACHINE.

APPLICATION FILED NOV. 11, 1919.

Reissued Mar. 9, 1920.

14,814.

7 SHEETS—SHEET 6.

Inventor

Joseph Berger Jr

By Stewart & Mason

J. BERGER, Jr.

SEWING MACHINE.

APPLICATION FILED NOV. 11, 1919.

Reissued Mar. 9, 1920.

14,814.

7 SHEETS—SHEET 7.

Inventor

Joseph Berger Jr

By Sturtevant & Mason

Attorneys

UNITED STATES PATENT OFFICE.

JOSEPH BERGER, JR., OF UTICA, NEW YORK, ASSIGNOR TO UNION SPECIAL MACHINE COMPANY, OF CHICAGO, ILLINOIS, A CORPORATION OF ILLINOIS.

SEWING-MACHINE.

14,814. Specification of Reissued Letters Patent. Reissued Mar. 9, 1920.

Original No. 1,247,072, dated November 20, 1917, Serial No. 139,823, filed December 30, 1916. Application for reissue filed November 11, 1919. Serial No. 337,231.

*To all whom it may concern:*

Be it known that I, JOSEPH BERGER, Jr., a citizen of the United States, residing at Utica, in the county of Oneida and State of New York, have invented certain new and useful Improvements in Sewing-Machines, of which the following is a description, reference being had to the accompanying drawings, and to the figures of reference marked thereon.

The invention relates to new and useful improvements in sewing machines, and more particularly to a sewing machine for uniting and covering the edges of fabric sections.

An object of the invention is to provide a sewing machine of the above character wherein the edge portions of the fabric sections are joined and the edges thereof covered by a stitching mechanism having three needles, and upper and lower coöperating mechanisms, and wherein the edge portions are trimmed in advance of the stitching thereof by a mechanism disposed so that the trimmed edge portions of the fabric sections will overlap with the trimmed edges thereof terminating between and adjacent the outer needles of the stitching mechanism and wherein the overlapped edge portions are stitched together by the center needle.

Another object of the invention is to provide a sewing machine of the above character wherein the edge portions of fabric sections may be turned out of the plane of the fabric sections and trimmed, and afterward returned to the plane of the fabric sections in overlapped relation to each other so that the overlapped edge portions will be joined by stitching, the stitches of which extend through as well as around the overlapped portions.

A further object of the invention is to provide a machine of the above character wherein the overlapped portions of the fabric sections are wholly within the limits of the stitching mechanism so that the trimmed edges will be covered by the stitching.

A still further object of the invention is to provide a sewing machine of the above character wherein the trimmed edge portions are operated upon after leaving the trimming mechanism by devices which positively turn one of the edge portions underneath the other so that the edge portions overlap before they reach the stitching mechanism.

These and other objects will in part be obvious and will in part be hereinafter more fully disclosed.

In the drawings, which show by way of illustration one embodiment of the invention:—

Figure 1:
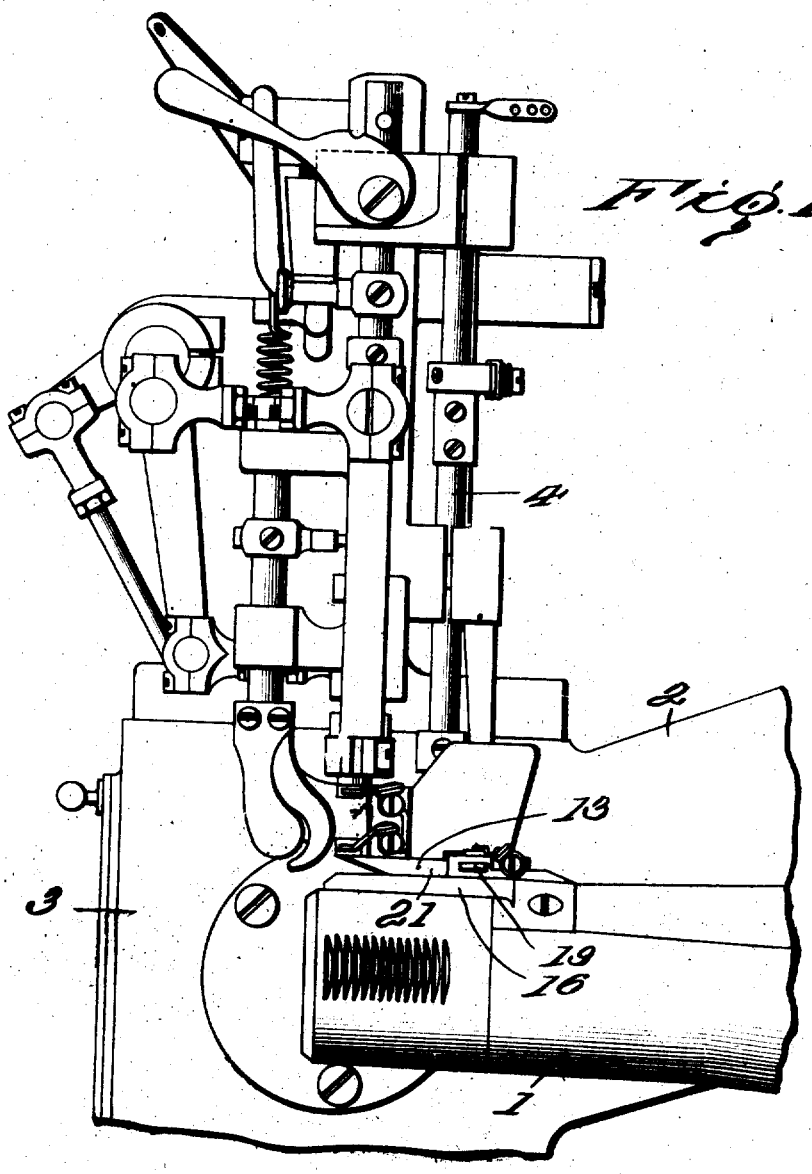
Figure 1 is a view in end elevation showing a part of a sewing machine embodying my improvements.
Figure 2:
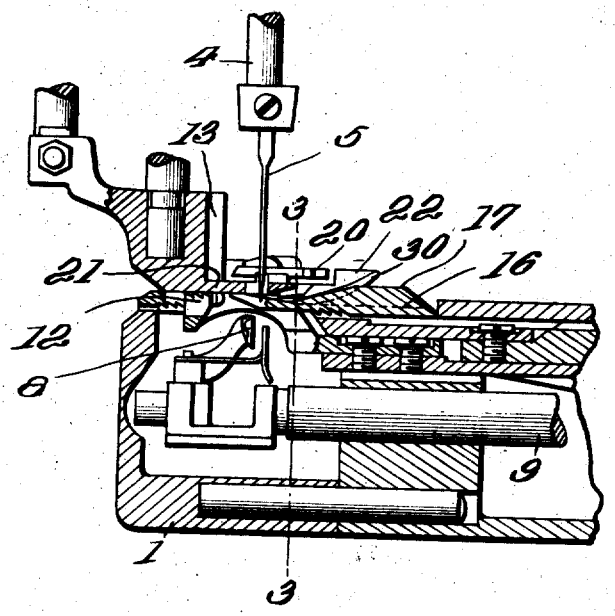
Fig. 2 is a longitudinal sectional view through the presser foot and the end of the work support, also showing the needle bar and needles.
Figure 3:
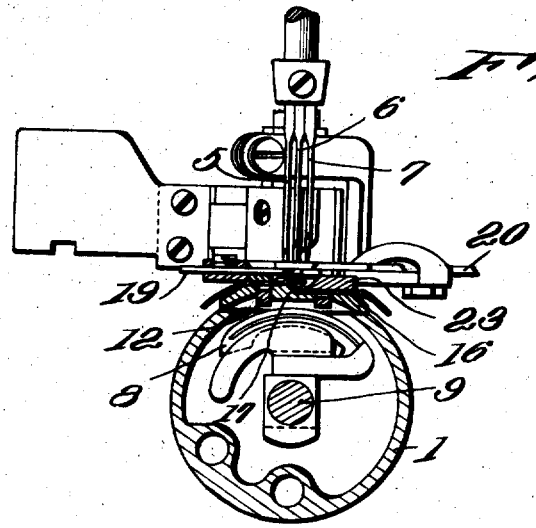
Fig. 3 is a sectional view on the line 3—3 of Fig. 2.
Figure 4:
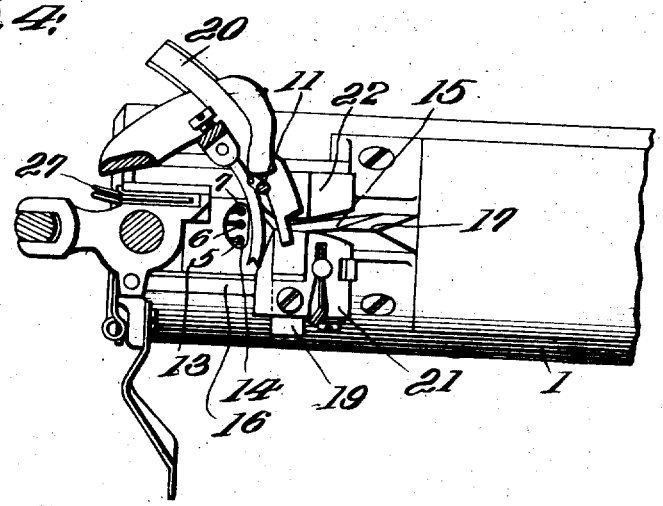
Fig. 4 is a view, partly in top plan and partly in section, showing the work support, the presser foot, the trimming blades, the needles, and the cross thread laying devices.

The invention in its broadest aspects is directed to a sewing machine wherein the edge portions of the fabric sections are joined by a stitching mechanism having three needles, a cross thread laying mechanism coöperating therewith above the work support, and complemental stitch forming mechanism coöperating therewith beneath the work support. The edge portions of the fabric sections to be united are trimmed in advance of the stitching mechanism by a mechanism which is so disposed that the trimmed edge portions of the fabric sections will overlap with the trimmed edges thereof terminating between and adjacent the outer needles of the stitching mechanism. The overlapped sections will, therefore, be penetrated by the center needle which will unite said overlapped sections, and the trimmed edges of the fabric sections will be covered by the concatenated threads of the stitching mechanism.

In the specific embodiment of the invention as shown in the drawings, the trimming devices which trim the edge portions of the fabric sections in advance of the needles are arranged horizontally and at such a distance from the work support that after the edges are trimmed and brought into overlapped relation, the arrangement of the overlapped edges relative to the stitches above referred to is accomplished; that is to say, the edge portions of the fabric sections are overlapped with the trimmed edges thereof terminating between and adjacent the outer edges of the stitching mechanism, and thus the trimmed edges are completely covered by the concatenated threads of the stitching mechanism and the overlapped portions are also joined by the center needle which passes through such portions. In order that the fabric sections may be brought into the range of the trimming devices, the edge portions thereof are turned out of the plane of the fabric sections and within range of the trimming mechanism. After they are trimmed, they are brought into overlapped relation. This turning of the edge portions out of the plane of the fabric sections and returning the same into the same plane but in overlapped relation is brought about by the following mechanism. The work support is provided with a rib located in front of the presser foot and the trimming mechanism, and this rib serves as a means for aiding in turning the edge portions of the fabric sections out of the plane of the fabric sections. The presser foot is provided with a slot located in a line intermediate the outer needles of the stitching mechanism and extending to the front end of the foot to receive and guide the up-turned edges to the trimmers. The rib is cut away on one side thereof in rear of the trimming point so that the edge portion at that side of the rib may be turned down underneath the other edge portion. The presser foot is provided with a guide which positively turns down this edge portion of the fabric section, while the other edge portion is positively held raised. There is a clearance space in the foot over this guide for the other or upper edge portion. The rear end of the slot in the foot positively turns down this upper edge portion so that said edge portions are overlapped before they reach the stitching mechanism. The distance of the trimmer blades above the work support is so proportioned that the overlapped edges lie within the limits of the stitching mechanism. The stitching mechanism preferably consists of three needles with which a single threaded looper coöperates beneath the work support, and a cross thread laying mechanism coöperates with the needles above the work support, so that the overlapped edge portions are not only joined but the trimmed edges are covered by the stitching.

My improvements may be applied to sewing machines of various types and, therefore, I have illustrated in the drawings only a portion of one of the types of machine to which the invention is adapted. In the type of machine illustrated, the material is fed off over the end of a cylindrical work support, which is indicated at 1 in the drawings. This work support is carried by a projecting arm 2 which, in turn, is carried by a standard 3. The standard also carries an overhanging arm in which a needle bar 4 is mounted. The needle bar 4 is reciprocated by the usual mechanism and is provided with three needles, indicated at 5, 6 and 7. Coöperating with the needles below the work support is a looper 8 which is located in the work support, and this looper is carried by a looper supporting shaft 9. Coöperating with the needles above the work support is a thread hook 10 which is adapted to engage a cross thread extending through the fixed guide 11 and lay said cross thread in the form of a loop for certain of the needles to enter so that the cross thread will connect all three of the needles. The looper coöperating with all the needles beneath the work support causes the looper thread to concatenate with all three of the needle threads.

Figure 5:
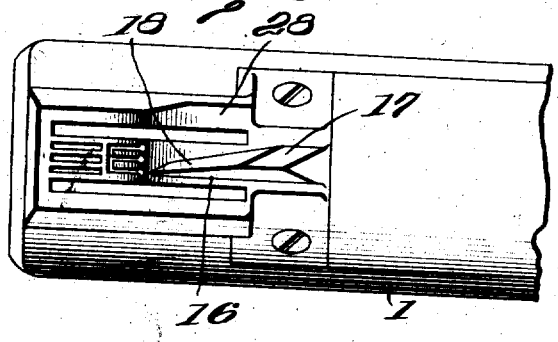
Fig. 5 is a top plan view of the work support.
Figure 6:
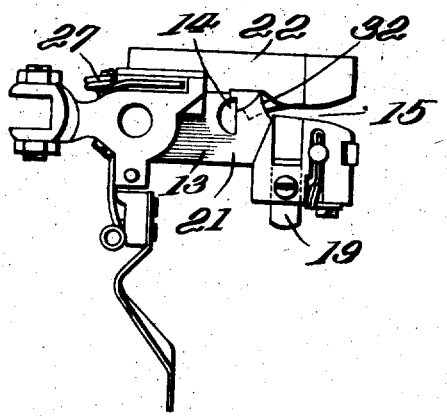
Fig. 6 is a top plan view of the presser foot with the strip deflector in its inoperative position.
Figure 7:
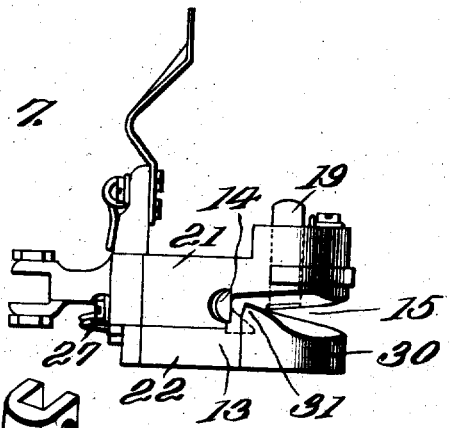
Fig. 7 is a bottom plan view of the same.
Figure 8:
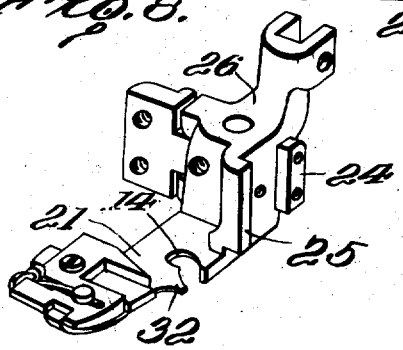
Fig. 8 is a perspective view of the main portion of the presser foot.
Figure 9:
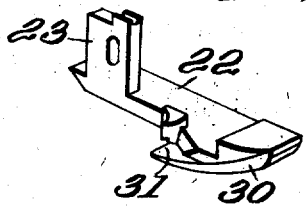
Fig. 9 is a perspective view of the auxiliary portion of the presser foot.
Figure 10:
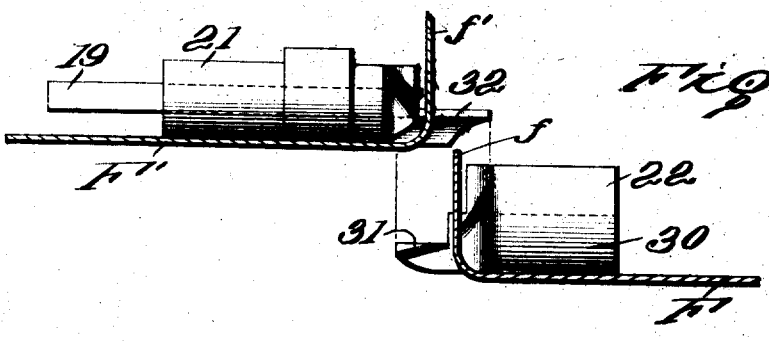
Fig. 10 is a diagrammatic view showing the parts of the presser foot separated and the relation of the fabric sections thereto as they enter the slot at the front end of the presser foot.
Figure 11:
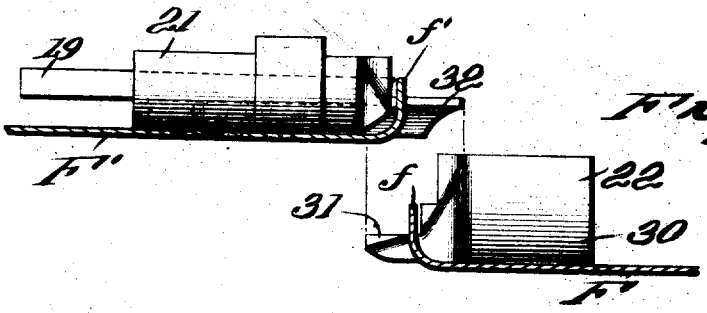
Fig. 11 is a similar view, but showing the positions of the fabric sections after they are trimmed.
Figure 12:
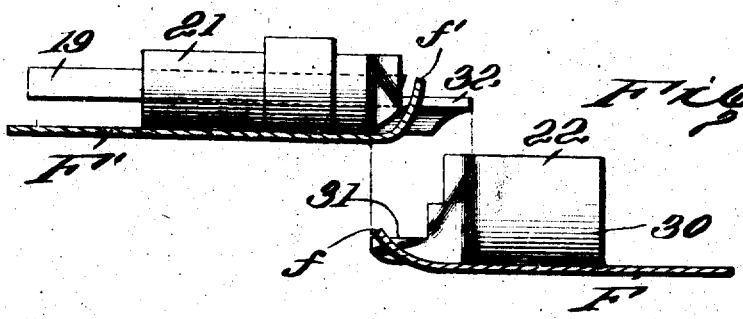
Fig. 12 is a similar view, but showing the edge portion of one of the fabric sections as turned down underneath the other.
Figure 13:
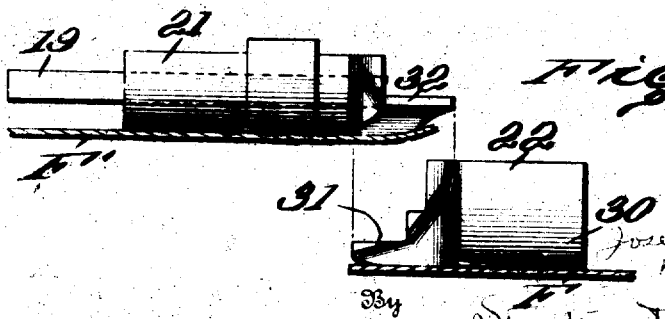
Fig. 13 is a similar view, but showing both edge portions returned to the plane of their respective fabric sections and overlapped.

The material is fed along the work support by a feeding device 12 which is shown as constructed so as to feed the material off from the end of the work support. The material is held on the work support by a presser foot 13. The presser foot is formed with an opening 14 for the needles and with a slot 15 which is in front of the needle opening and leads from the front end of the presser foot. This slot is adapted to receive the up-turned edge portions of fabric sections. The throat plate 16 of the machine is formed with an inverted V-shaped rib 17 which extends into the slot 15. This rib 17 is cut away, as indicated at 18 in Fig. 5 of the drawings. Mounted on the presser foot is a fixed trimming blade 19. Coöperating with this fixed blade is a movable blade 20. This movable trimming blade moves back and forth in a horizontal plane and is adapted to trim the up-turned edge portions of the fabric sections which are fed along the slot 15.

The presser foot is formed with a main section 21 and an auxiliary section 22. The auxiliary section 22 is carried by a shank 23 which slides between lugs 24 and 25 carried by the main shank 26 supporting the main section 21 of the presser foot. A spring 27 bearing against the upper end of this shank 23 yieldingly forces the auxiliary section downwardly, and the downward movement is limited in the usual manner. The throat plate is formed with a depressed section 28 at one side of the rib 17, and the auxiliary section 22 of the presser foot has a depending portion 30 which is located so as to hold the fabric on this depressed section 28. The auxiliary section 22 is provided with a projecting guide 31 which extends into the slot 15 and close to the cut-away portion 18 of the rib. The main section of the presser foot is formed with a projecting guide 32 which forms the rear wall of the slot 15.

Figure 14:
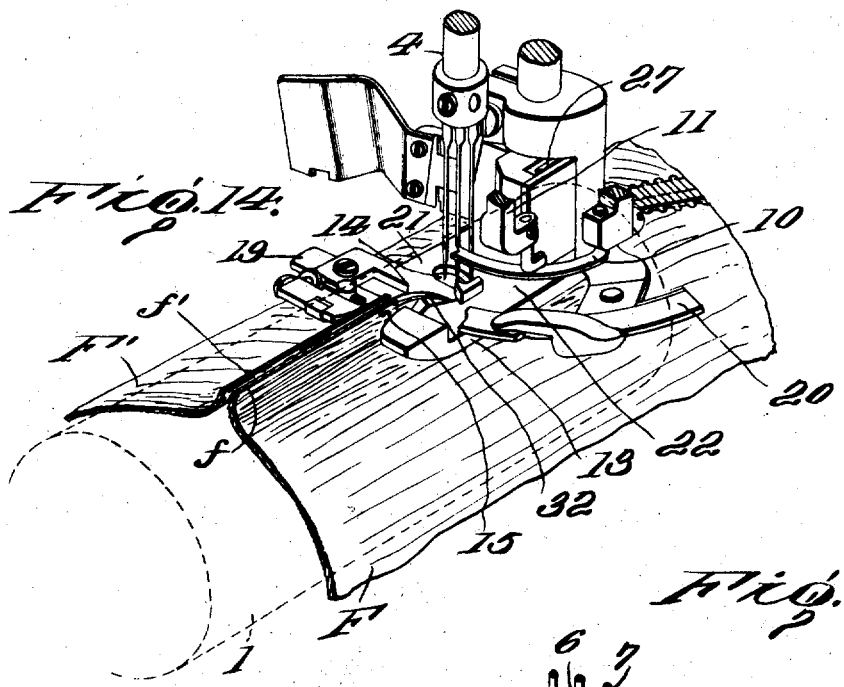
Fig. 14 is a perspective view showing the work support, the presser foot, the trimming devices, the needles and the cross thread laying devices and the fabric sections which are being joined.
Figure 15:
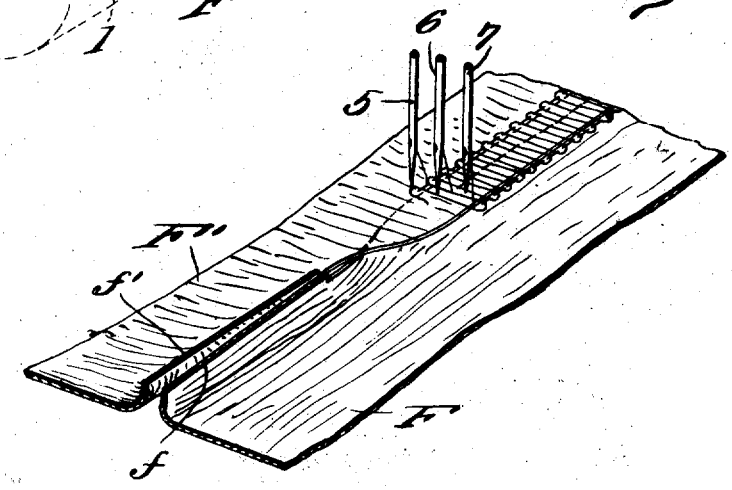
Fig. 15 is a perspective view showing, more or less diagrammatically, the needles and the manner of manipulating and joining the fabric sections.
Figure 16:
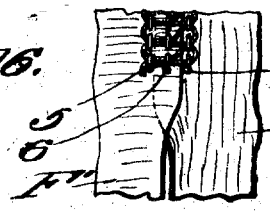
Fig. 16 is a plan view of a portion of the fabric sections as shown in Fig. 15.
Figure 18:
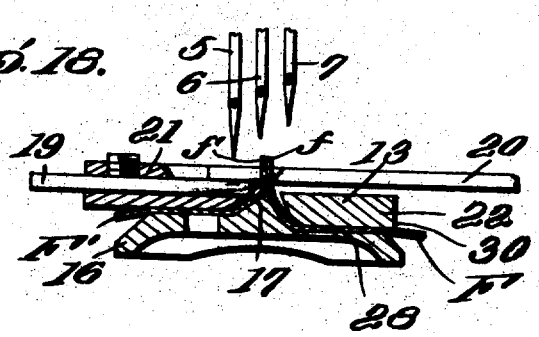
Fig. 18 is a transverse sectional view through the work support and the presser foot at a point in front of the trimming blades.
Figure 19:
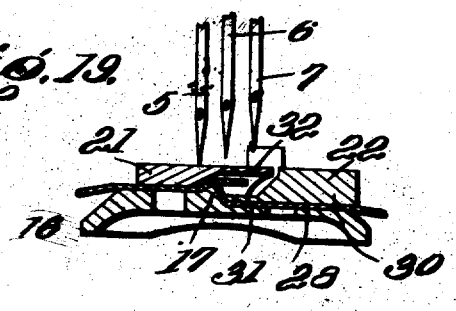
Fig. 19 is a similar transverse sectional view at a point in rear of the trimming blades.
Figure 20:
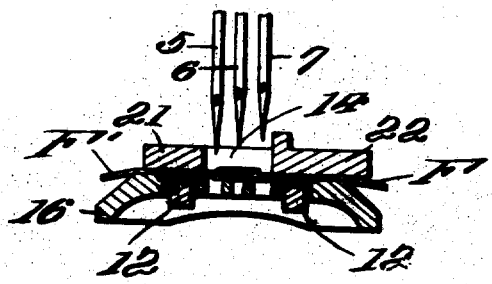
Fig. 20 is a similar transverse sectional view substantially at the stitching point.

The two fabric sections to be joined are indicated at F and F′ in the drawings. The edge portions *f* and *f′*, respectively, of these fabric sections are turned up, as shown in Figs. 14 and 15 of the drawings, and these up-turned portions are guided into the slot in the presser foot. The rib 17 serves as a support for these up-turned portions and directs the same into the slot in the presser foot. The movable trimming blade 20 operating across the slot trims the up-turned portions of the fabric sections. The throat plate, as above noted, has a depressed section, and the surface thereof is slightly lower than the surface of the throat plate on the other side of the rib 17, as clearly shown in Fig. 18 of the drawings. This elevates the section F′ above the section F and facilitates the turning of the edge portion *f* underneath the edge portion *f′*. The guide 31, which is located just in rear of the trimming blades, operates upon the edge portion *f* after it is trimmed to crowd the same underneath the edge portion *f′*. There is a clearance space above this guide 31 for the edge portion *f′*, and the guide 32 which is in reality the rear end of the slot 15 serves to turn down the edge portion *f′* on top of the edge portion *f*. Thus the two edge portions are overlapped before they cross the needle opening 14 in the presser foot.

Figure 17:
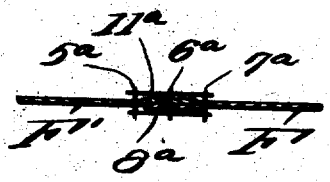
Fig. 17 is a view, showing, more or less diagrammatically, the overlapped fabric sections and the relation of the stitching threads joining the same.

The needles are so disposed that the center needle 6 passes through the overlapped edge portions of the fabric sections, while the needle 5 passes through the fabric section F′ only and the needle 7 passes through the fabric section F only. In Fig. 17 of the drawings, the thread of the needle 5 is indicated at $5^a$; the thread of the needle 6 is indicated at $6^a$, and the thread of the needle 7 is indicated at $7^a$. The cross thread laid by the hook 11 is indicated at $11^a$, and the looper thread is indicated at $8^a$. It will be seen from this figure that the needle thread $6^a$ passes through the overlapped fabric sections, while the needle threads $5^a$ and $7^a$ pass, respectively, through the fabric sections F′ and F only. The cross thread and the looper thread not only join the needle threads $5^a$ and $7^a$, but they cover the trimmed edges of the fabric sections which lie close to these threads. In other words, the overlapped sections lie wholly within the limits of the stitching mechanism.

The trimming blades 19 and 20 are disposed a certain distance above the throat plate on which the fabric sections rest so that the up-turned trimmed edges, when brought back into the plane of the fabric sections, will lie close to the outer needles, respectively, but within the paths of the needles. Inasmuch as the throat plate on one side of the rib 17 is depressed below the surface on the other side of the throat plate, the rib, as clearly shown in Fig. 18 of the drawings, is at one side of the center needle. This insures the overlapped edge portions being properly centered between the needles when brought back to the plane of the fabric sections, notwithstanding that one of the up-turned edges is of greater height than the other.

From the above, it will be apparent that I have provided a sewing machine wherein the edge portions of the fabric sections are joined and the edges thereof covered by a stitching mechanism, and wherein a trimming mechanism operates to trim the edge portions in advance of the needles and is so disposed that the trimmed edge portions of the fabric sections will overlap with the trimmed edges thereof terminating between and adjacent the outer needles of the stitching mechanism and the overlapped sections will be penetrated by the center needle.

It will also be apparent that the invention in its broadest aspects is not limited to horizontal trimmers on which are turning devices for bringing the edge portions of the fabric sections into the range of the trimming mechanism, but other ways of arranging the mechanism for trimming the edge portions may be devised, the essential feature being in the arrangement of the mechanism for the trimming of the edge portions so that said edge portions as they are presented to the stitching mechanism will overlap within the limits of the outer edges and be penetrated by the center needle.

The presser foot *per se* forms no part of the present invention, but is shown, described and claimed in my Patent No. 1,294,226, dated February 11, 1919; the throat plate *per se* likewise forms no part of this invention, but is shown, described and claimed in my Patent 1,283,639, dated November 5, 1918.

It is obvious that minor changes in the details of construction and the arrangement of parts may be made without departing from the spirit of this invention as set forth in the appended claims.

Having thus described the invention, what I claim as new and desire to secure by Letters-Patent is:—

1. The combination of stitching mechanism adapted to form covering stitches, of a work support having a rib for guiding and supporting up-turned edge portions of fabric sections to be united, a trimming mechanism including horizontal trimming devices for trimming the up-turned edge portions, means located between the trimming mechanism and the stitching mechanism for positively turning one of the trimmed edge portions underneath the other trimmed edge portion whereby said trimmed edge portions are overlapped before they reach the stitching mechanism, said work support having a depressed section at one side of the rib and in front of the stitching mechanism whereby one section of the fabric is guided underneath the presser foot in a lower plane than the other to facilitate the overlapping of the edge portions of the fabric sections.

2. The combination of stitching mechanism adapted to form covering stitches, a work support having an inverted V-shaped rib for guiding and supporting up-turned edge portions of fabric sections to be united, the trimming mechanism including horizontal trimming devices for trimming the up-turned edge portions, means located between the trimming mechanism and the stitching mechanism for positively turning one of the edge portions underneath the other trimmed edge portion whereby said trimmed edge portions are overlapped before they reach the stitching mechanism, said V-shaped rib being cut away to permit the underneath edge portions to be turned down.

3. The combination of stitching mechanism adapted to form covering stitches, a work support having an inverted V-shaped rib for guiding and supporting up-turned edge portions of fabric sections to be united, the trimming mechanism including horizontal trimming devices for trimming the up-turned edge portions, means located between the trimming mechanism and the stitching mechanism for positively turning one of the edge portions underneath the other trimmed edge portion whereby said trimmed edge portions are overlapped before they reach the stitching mechanism, said V-shaped rib being cut away to permit the underneath edge portion to be turned down and said work support having a depressed section alongside of said rib on the cut-away side thereof to facilitate turning of the lower edge portion underneath the other edge portion.

4. The combination of a work support, stitching mechanism including three needles, a cross thread laying device coöperating with the needles above the work support, and a looper coöperating with the needles beneath the work support, a trimming mechanism including horizontal trimming devices located in front of the needles, means for directing the up-turned edges of the fabric sections to the trimming mechanism, and means located between the trimming mechanism and the needles for positively turning the trimmed edge portions into overlapped relation so that said overlapped edge portions may be joined by the stitching mechanism, said trimming mechanism being disposed relative to the work support so that the overlapped edge portions lie entirely between the outer needles whereby the trimmed edges will be covered by the stitches.

5. The combination of a work support, stitching mechanism including three needles arranged in line, a cross thread laying device coöperating with the needles above the work support, a looper coöperating with the needles below the work support, trimming mechanism including horizontal trimming blades located in front of the needles, means for directing the up-turned edges of fabric sections to the needles, a guide located between the trimming mechanism and the needles for positively crowding one of the up-turned edges under the other, and guiding means for turning the last-named edge portion down onto the first-named edge portion whereby said edge portions are overlapped substantially in the plane of the fabric sections.

6. The combination of a work support, stitching mechanism including three needles arranged in line, a cross thread laying device coöperating with the needles above the work support, a looper coöperating with the needles below the work support, trimming mechanism including horizontal trimming blades located in front of the needles, means for directing the up-turned edges of fabric sections to the needles, a guide located between the trimming mechanism and the needles for positively crowding one of the up-turned edges underneath the other, and guiding means for turning the last-named edge portion down onto the first-named edge portion whereby said edge portions are overlapped substantially in the plane of the fabric sections.

7. The combination of a work support, stitching mechanism including three needles, a cross thread laying mechanism cooperating with said needles above the work support, a complemental stitch forming mechanism coöperating with the needles beneath the work support, mechanism for trimming the edge portions of the fabric sections in advance of the needles, said mechanism for trimming the edge portions of the fabric sections being disposed and arranged so that the trimmed edge portions will overlap with the trimmed edges thereof terminating between and adjacent the outer needles of the stitching mechanism, whereby said overlapped edge portions will be stitched together by the center needle and both trimmed edges thereof will be covered by the concatenated threads of the stitching mechanism, and a feeding mechanism operating to feed the trimmed edge portions past the stitching mechanism.

8. The combination of a work support, stitching mechanism including three needles arranged in a line at substantial right angles to the line of feed, a single threaded looper coöperating with the needles beneath the work support, a cross thread mechanism for laying a single cross thread coöperating with the needles above the work support, and a mechanism in advance of the stitching mechanism for trimming the edge portions of the fabric sections, said mechanism for trimming the edge portions of the fabric sections being disposed and arranged so that the trimmed edge portions will overlap with the trimmed edges thereof terminating between and adjacent the outer needles of the stitching mechanism whereby said overlapped edge portions will be stitched together by the center needle and both trimmed edges thereof will be covered by the concatenated threads of the stitching mechanism, and a feeding mechanism operating to feed the trimmed edge portions past the stitching mechanism.

In testimony whereof I affix my signature.

JOSEPH BERGER, Jr.